(12) United States Patent
Hayes et al.

(10) Patent No.: US 11,939,751 B2
(45) Date of Patent: Mar. 26, 2024

(54) FAUCET SPOUT MOUNTING ASSEMBLY

(71) Applicant: Delta Faucet Company, Indianapolis, IN (US)

(72) Inventors: Gerald Robert Hayes, Lebanon, IN (US); Scott Ellis Sorrell, Fountaintown, IN (US)

(73) Assignee: Delta Faucet Company, Indianapolis, IN (US)

( * ) Notice: Subject to any disclaimer, the term of this patent is extended or adjusted under 35 U.S.C. 154(b) by 269 days.

(21) Appl. No.: 17/566,755

(22) Filed: Dec. 31, 2021

(65) Prior Publication Data

US 2023/0212844 A1    Jul. 6, 2023

(51) Int. Cl.
*E03C 1/04* (2006.01)
*F16L 37/086* (2006.01)
*F16L 37/092* (2006.01)

(52) U.S. Cl.
CPC .......... *E03C 1/0403* (2013.01); *F16L 37/086* (2013.01); *F16L 37/0926* (2019.08)

(58) Field of Classification Search
None
See application file for complete search history.

(56) References Cited

U.S. PATENT DOCUMENTS

| | | | |
|---|---|---|---|
| 6,123,106 A | 9/2000 | Benstead | |
| 6,220,297 B1 | 4/2001 | Marty et al. | |
| 6,588,453 B2 | 7/2003 | Marty et al. | |
| 6,757,921 B2 | 7/2004 | Esche | |
| 7,997,301 B2 | 8/2011 | Marty et al. | |
| 8,127,782 B2 | 3/2012 | Jonte et al. | |
| 8,185,984 B2 * | 5/2012 | Meehan | E03C 1/0401 4/675 |
| 8,578,966 B2 | 11/2013 | Thomas et al. | |
| 8,789,771 B2 | 7/2014 | Esche et al. | |
| 8,844,564 B2 | 9/2014 | Jonte et al. | |
| 9,200,435 B2 | 12/2015 | Andersen et al. | |
| 9,243,392 B2 * | 1/2016 | Marty | H01C 1/01 |
| 2006/0130907 A1 | 6/2006 | Marty et al. | |
| 2006/0200903 A1 | 9/2006 | Rodenbeck et al. | |
| 2006/0202142 A1 | 9/2006 | Marty et al. | |
| 2007/0246550 A1 | 10/2007 | Rodenbeck et al. | |

OTHER PUBLICATIONS

Delta Faucet Company, Trinsic® & Trask™, Models 9159T-DST, 99597-DST and 19933T-DST, Feb. 5, 2019, 6 pages.

* cited by examiner

*Primary Examiner* — Christine J Skubinna
(74) *Attorney, Agent, or Firm* — Bose Mckinney & Evans LLP

(57) ABSTRACT

A faucet spout mounting system including a faucet spout tube, an inner adapter, and a bushing. The bushing is positioned radially intermediate the outer spout tube and the inner adapter. The inner adapter and the bushing engage to push flexible arms on the bushing against the outer spout tube, thus holding the bushing in place and compensating for tolerances in the spout mounting system.

20 Claims, 10 Drawing Sheets

FAUCET SPOUT MOUNTING ASSEMBLY

BACKGROUND AND SUMMARY OF THE DISCLOSURE

The present disclosure generally relates to a faucet and, more particularly, to a faucet spout mounting assembly including a bushing installed in a faucet spout.

Current kitchen faucet spouts can be tall and extend far down into the sink. This, coupled by a heavy pull down wand can create a large moment, which induces stress and force on the spout to hub joint. Additionally, tolerances between the spout tube and an inner adapter can cause variations in the fit between the spout and hub and result in a loose joint or loose spout rotation. A known fix to reduce the looseness is to require higher interferences, however, this can make the parts difficult to install in a mass production environment.

There remains a need for a faucet spout mounting assembly that compensates for tolerances between the faucet spout and mounting hub, and reduces the looseness of the faucet spout.

The present disclosure provides a faucet spout mounting assembly including a faucet spout tube, an inner adapter coupled to a mounting hub, and a bushing. The bushing is positioned intermediate to the inner adapter and the faucet spout tube and compensates for tolerances in the mounting assembly to reduce looseness of the faucet spout tube relative to the mounting hub.

According to an illustrative embodiment of the present disclosure, a faucet spout mounting assembly includes an outer spout tube having an inner surface, an inner adapter including a radially outwardly extending protrusion having a downwardly angled surface, and a bushing positioned radially intermediate the outer spout tube and the inner adapter. The bushing includes a plurality of circumferentially spaced flexible arms, and an upwardly angled surface supported by the flexible upper arms. The downwardly angled surface of the inner adapter engages the upwardly angled surface of the bushing thereby forcing the flexible upper arms of the bushing against the inner surface of the outer spout tube.

According to another illustrative embodiment of the present disclosure, a faucet spout mounting assembly includes an outer spout tube having an inner surface, and an inner adapter having a downwardly angled surface. A mounting hub is positioned below the outer spout tube, wherein the inner adapter extends above the mounting hub. A bushing is positioned radially intermediate the outer spout tube and the inner adapter. An upper constraint is defined between the bushing and the outer spout tube, and a lower constraint is defined between the bushing and the mounting hub. The lower constraint is positioned axially below the upper constraint.

According to a further illustrative embodiment of the present disclosure, a faucet spout mounting assembly including an outer spout tube having an inner surface, an inner adapter having an angled surface, a mounting hub positioned below a lower end of the outer spout tube, wherein the inner adapter extends above the mounting hub, and a bushing. The bushing includes an upper constraint and a lower constraint. The upper constraint includes a plurality of circumferentially spaced flexible upper arms, an angled surface supported by the flexible upper arms, and wherein the angled surface of the inner adapter forces the flexible upper arms outwardly against the inner surface of the outer spout tube. The lower constraint is defined by engagement between a lower surface of the bushing and an upper surface of the mounting hub.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

DETAILED DESCRIPTION OF THE DRAWINGS

Figure 1:
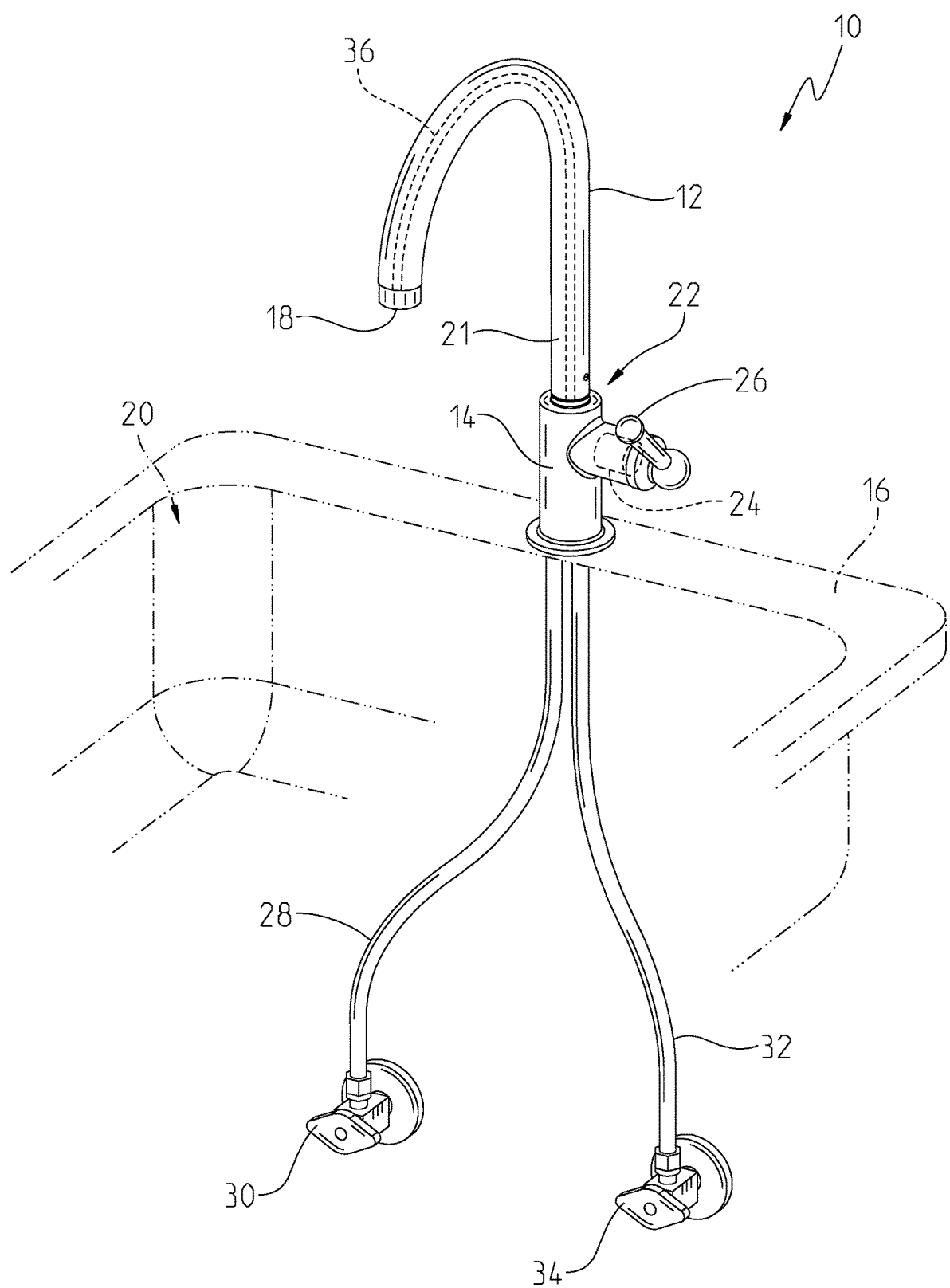
FIG. 1 is a perspective view of a faucet spout and hub installed on a sink deck by an illustrative faucet spout mounting assembly of the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

With reference initially to FIG. 1, a faucet 10 including a faucet spout 12 extending above a mounting hub 14 is shown mounted to a mounting deck, illustratively a sink deck 16. As is known, the faucet spout 12 includes a water outlet 18 configured to discharge water into a sink 20 supported by and extending below the sink deck 16. The faucet spout 12 includes an outer spout tube 21 which may be formed of a metal, such as a plated brass. Similarly, the mounting hub 14 may be formed of a metal, such a plated brass configured to match the outer surface finish of the spout 12. The illustrative mounting hub 14 includes an upwardly extending support or boss 17 defining an upper surface or shelf 19. The faucet spout 12 is coupled to the mounting hub 14 by a faucet spout mounting assembly 22 according to an illustrative embodiment of the present disclosure.

A manual water control valve 24 includes a handle 26 and is supported by the mounting hub 14. The valve 24 may be of conventional design, such as a mixing valve of the type disclosed in U.S. Pat. No. 8,578,966 to Thomas et al., the disclosure of which is expressly incorporated herein by reference. A hot water supply line 28 (e.g., a flexible tube) fluidly couples an inlet of the valve 24 to a hot water supply 30 (e.g., a hot water stop). A cold water supply line 32 (e.g., a flexible tube) fluidly couples an inlet of the valve 24 to a cold water supply 34 (e.g., a cold water stop). An outlet passageway 36 fluidly couples an outlet of the valve 24 to the water outlet 18 of the spout 12, and may be defined by a flexible tube received within the spout tube 21.

Figure 2:
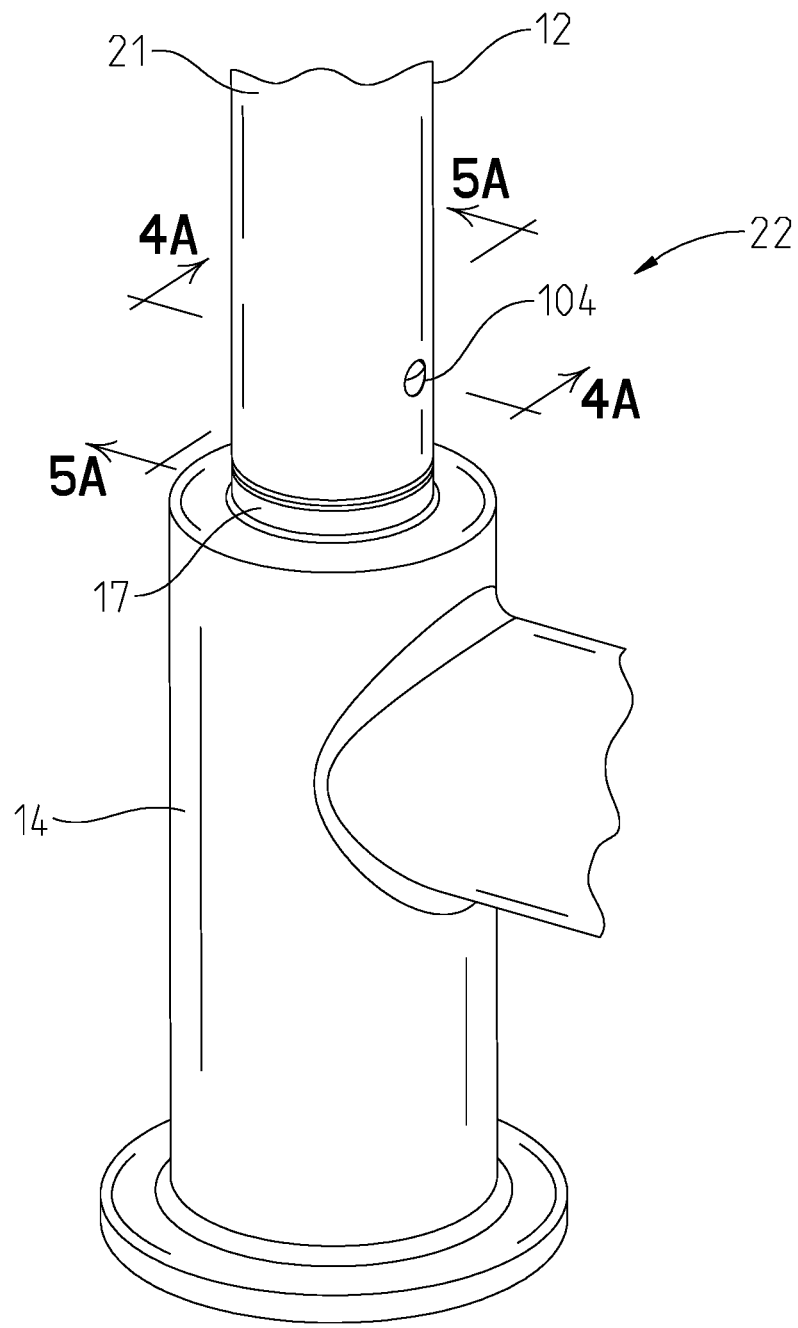
FIG. 2 is a perspective view of the illustrative faucet spout tube and hub of FIG. 1.
Figure 3:
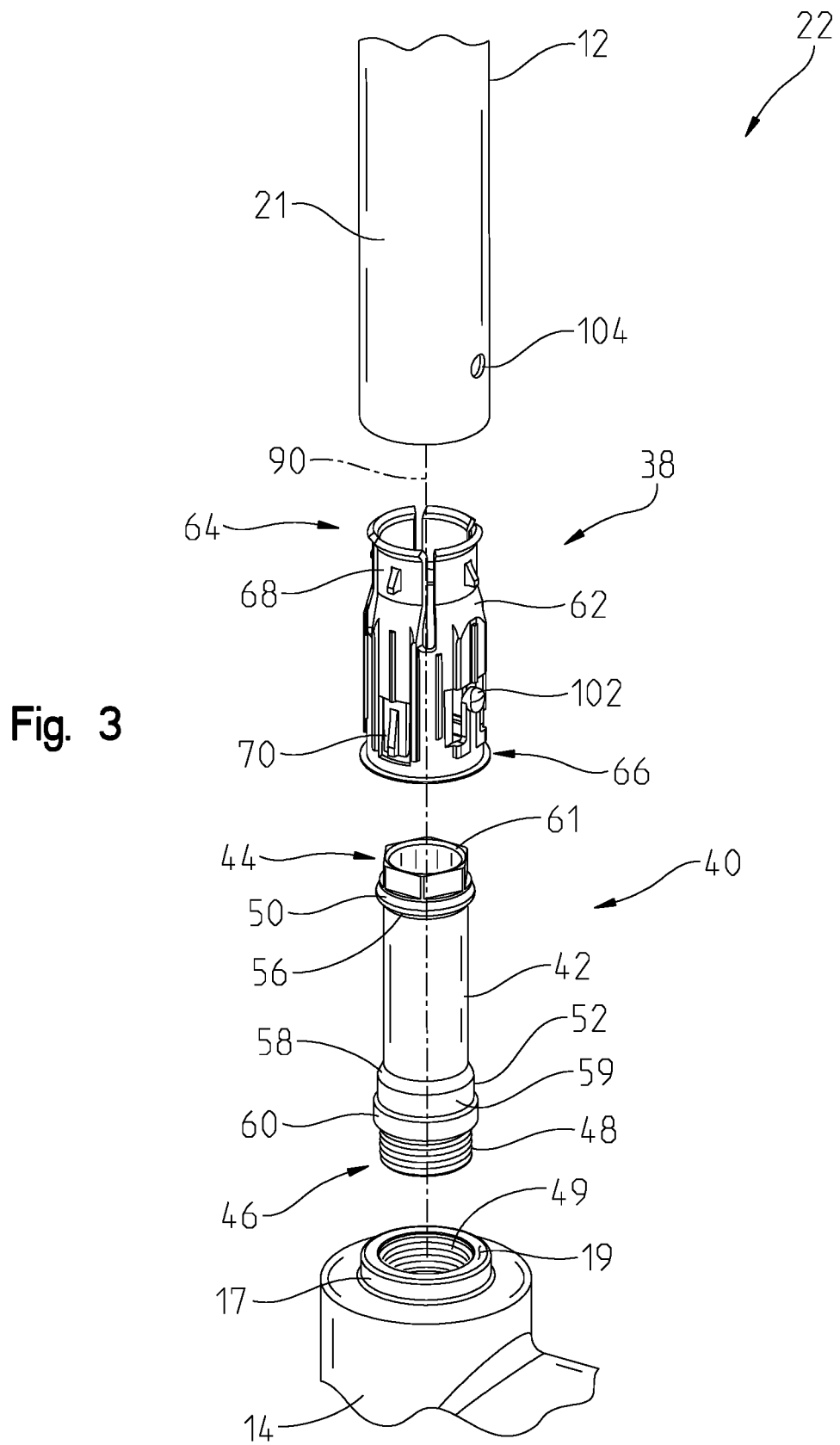
FIG. 3 is an exploded view of the illustrative spout mounting assembly of FIG. 2.

Referring now to FIGS. 2 and 3, the faucet spout mounting assembly 22 of the present disclosure includes a bushing 38 cooperating with an inner adapter 40. The inner adapter 40 illustratively includes a cylindrical tube 42 extending axially between an upper end 44 and a lower end 46. The inner adapter 40 is illustratively formed of a rigid material, such as a metal (e.g., brass). External threads 48 are illustratively supported at the lower end 46 of the tube 42 and couple to internal threads 49 formed within the boss 17 of the mounting hub 14. The inner adapter 40 includes an annular upper protrusion 50 extending radially outwardly from the tube 42, and an annular lower protrusion 52 positioned axially below the upper protrusion 50 and extending radially outwardly from the tube 42.

The upper protrusion 50 includes a downwardly angled surface 56. The downwardly angled surface 56 illustratively faces axially downward and radially inward. The lower protrusion 52 includes an upwardly angled surface 58, a planar intermediate surface 59, and a lower flange 60 extending radially outwardly from the intermediate surface 59. The upwardly angled surface 58 illustratively faces axially upward and radially inward. A tool engagement portion 61, illustratively flats, are supported at the upper end 44 of the inner adapter 40.

The bushing 38 illustratively includes a cylindrical body 62 that extends axially between an upper end 64 and a lower end 66, and concentrically receives the inner adapter 40. The bushing 38 may be formed of a polymer molded as a single piece. In one illustrative embodiment, the bushing 38 is formed of an acetal copolymer, such as Celcon, available from Celanese Corporation of Irving, Texas.

With respect to FIGS. 4A-7, the body 62 of the bushing 38 illustratively supports a plurality of circumferentially spaced flexible upper arms 68 and a plurality of circumferentially spaced flexible lower legs 70 positioned axially below the upper arms 68. The upper arms 68 and the lower legs 70 are configured to flex or move radially relative to the body 62. Illustratively, there are four circumferentially spaced upper arms 68 and two diametrically opposed lower legs 70. Axially extending gaps or spaces 72 extend between adjacent upper arms 68. A lower flange 74 defining a lower surface 75 extends annularly around the lower end 66 of the body 62 and includes a split or gap 76 to facilitate assembly over the inner adapter 40.

Each upper arm 68 illustratively includes a flexible area or hinge 78 to permit radial outward flexing or movement of the arm 68, thereby providing larger tolerance compensation between the spout tube 21 and the inner adapter 40. Each illustrative upper arm 68 further includes a lip 80 defining an upwardly angled surface 82. The upwardly angled surface 82 illustratively faces axially upward and radially outward. A radially outwardly extending upper tab 84 is supported by each upper arm 68 and includes a planar outer surface 86 at a radially outermost point and an upwardly angled surface 88. The gaps 72 at the upper end 64 help allow the upper arms 68 to flex and move radially outward relative to a center longitudinal axis 90 of the bushing 38 when force is applied at the surface 82 of each lip 80 by engagement with the surface 56 of the inner adapter 40. This force is created by the bushing 38 being captured between the upper surface 19 of the hub 14 and the surface 56 of the inner adapter 40. The radial outward movement of the upper arms 68 causes the surfaces 86 of the upper tabs 84 to engage an inner surface 92 of the spout tube 21.

Each lower leg 70 illustratively includes a flexible area or hinge 94 to permit radial outward flexing or movement of the leg 70 in response engagement with the inner adapter 40. Each illustrative lower leg 70 also includes a radially outwardly extending lower tab 96 having a planar outer surface 98 at a radially outermost point and an upwardly angled surface 100. The hinge 94 helps allow the lower legs 70 to flex and move radially relative to the longitudinal center axis 90 of the bushing 38 when force is applied by the inner surface 92 of the spout tube 21 and/or the surface 59 of the lower protrusion 52 of the inner adapter 40. In other words, a radial force is illustratively created by the inner surface 92 of the spout tube 21 when assembled (FIGS. 4C and 5C), thereby causing contact between the respective lower leg 70 of the bushing 38 and the lower protrusion 52 of the inner adapter 40.

The illustrative bushing 38 may also include an alignment tab 102 supported by a flexible arm 103. When bushing 38 is installed within faucet spout tube 21, alignment tab 102 engages with an alignment hole 104 formed within the spout tube 21. The alignment tab 102 and the alignment hole 104 are illustratively shown as circular, however, any shape could be used that would allow the alignment tab 102 to fit inside of alignment hole 104 and secure faucet spout tube 21 and the bushing 38 together. Additionally, the bushing 38 includes diametrically opposed anti-wobble ribs 106, 108 which are slightly tapered and extend radially outward in a downward direction from an outer surface of the body 62 of the bushing 38.

Figure 4A:
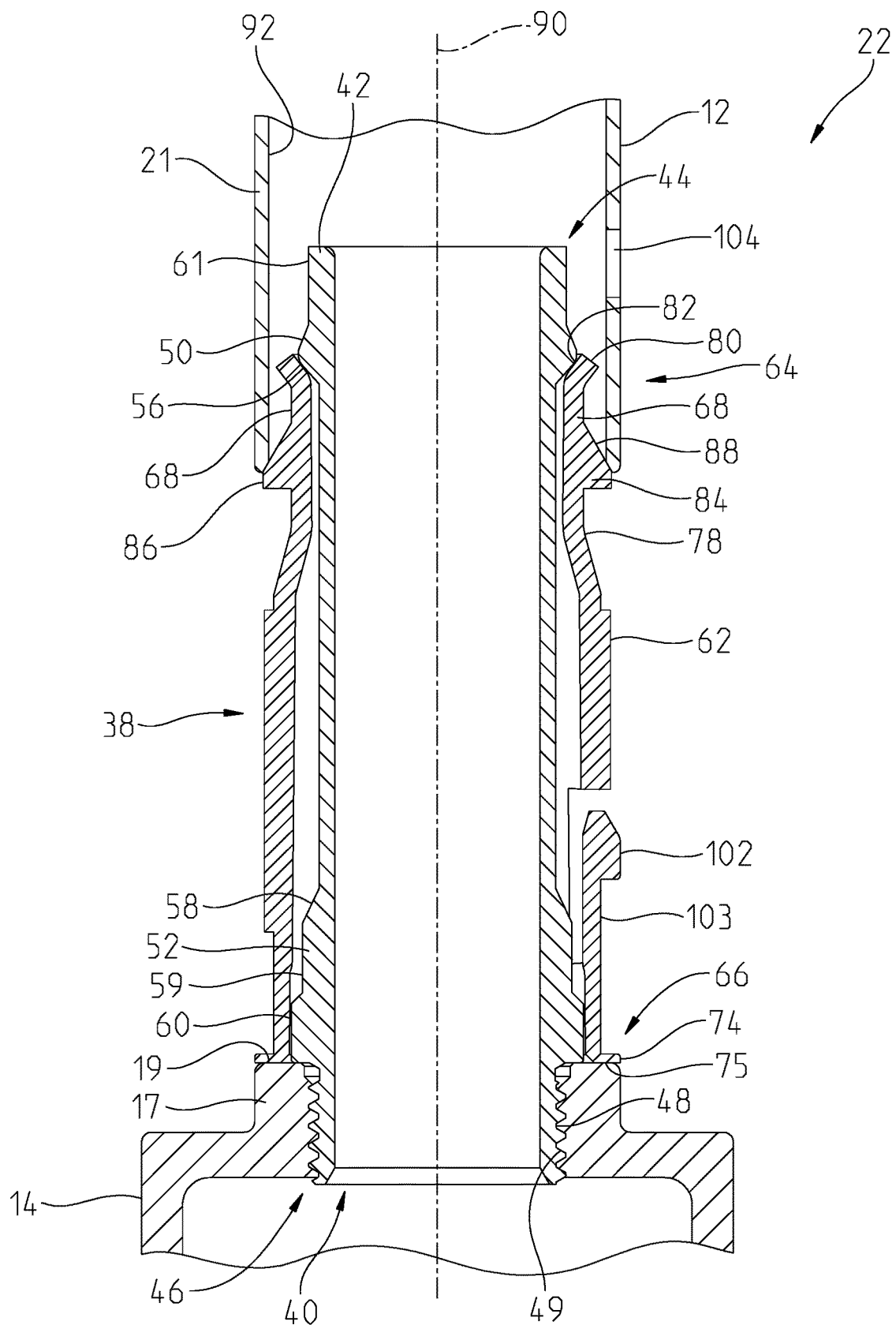
FIG. 4A is a cross-sectional view of the faucet spout mounting assembly taken along line 4A-4A of FIG. 2, shown at an initial installation step.
Figure 4B:
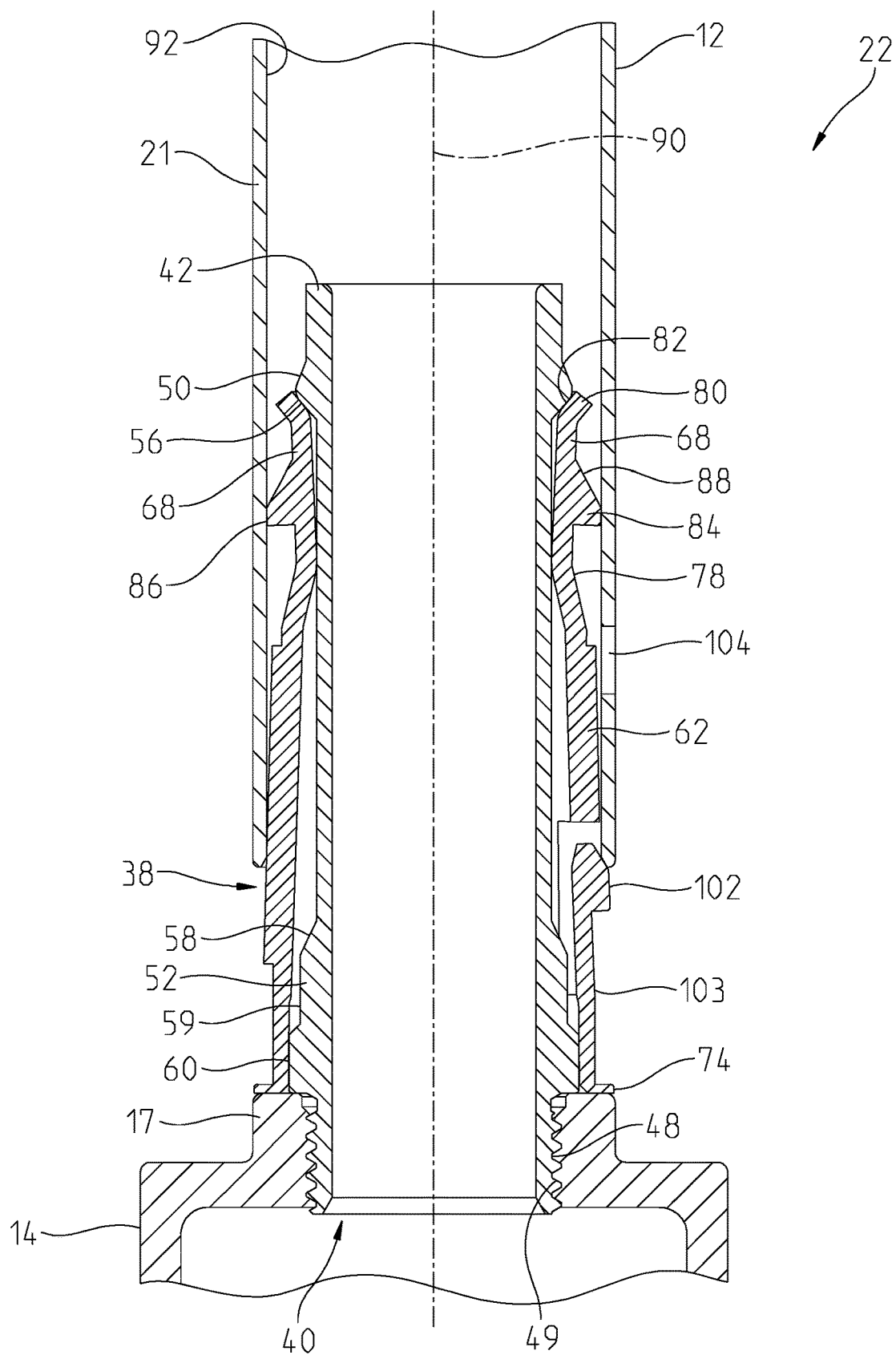
FIG. 4B is a cross-sectional view of the spout mounting assembly taken at line 4A-4A of FIG. 2, shown at an intermediate installation step.
Figure 4C:
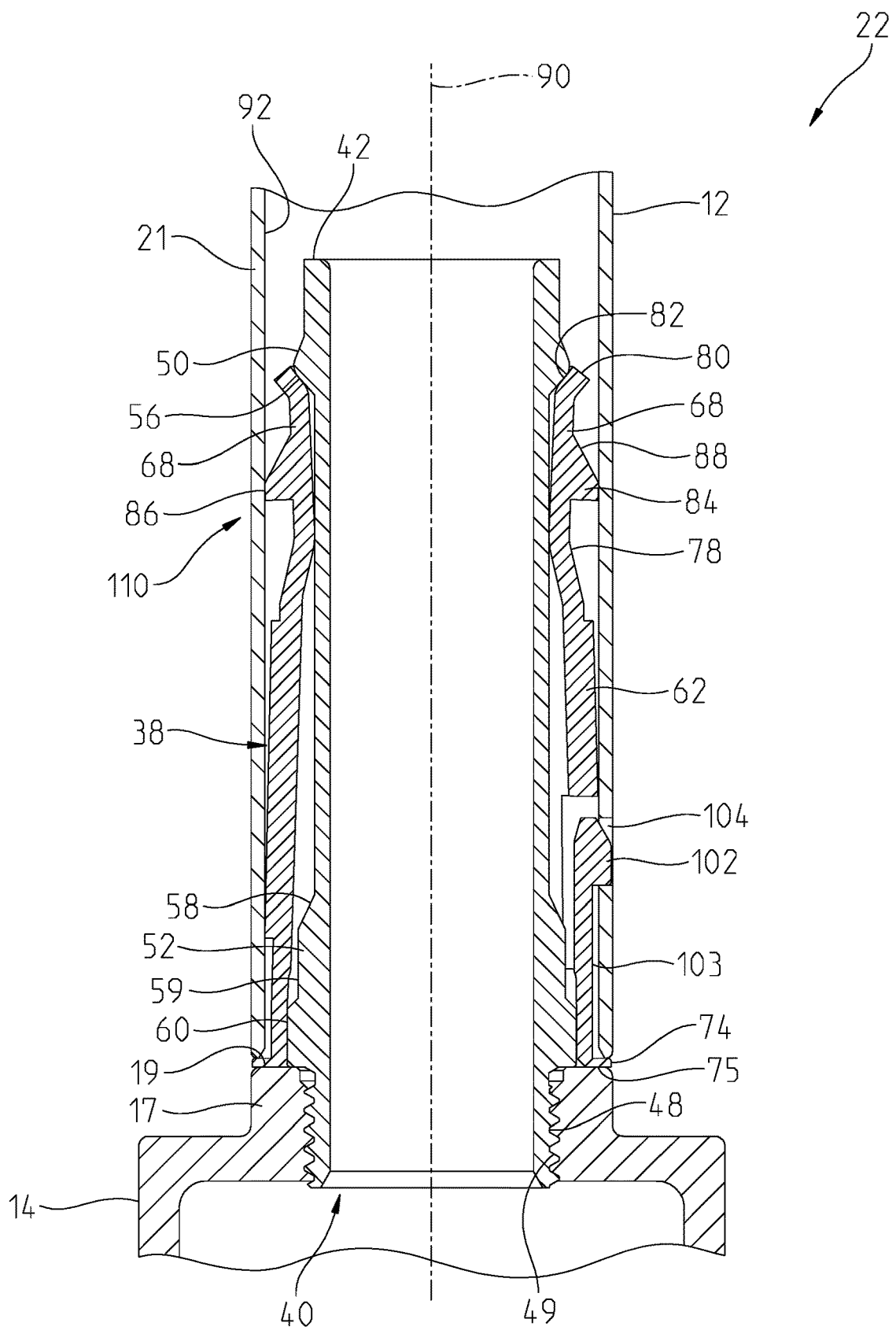
FIG. 4C is a cross-sectional view of the spout mounting assembly taken at line 4A-4A of FIG. 2, shown fully installed.
Figure 5A:
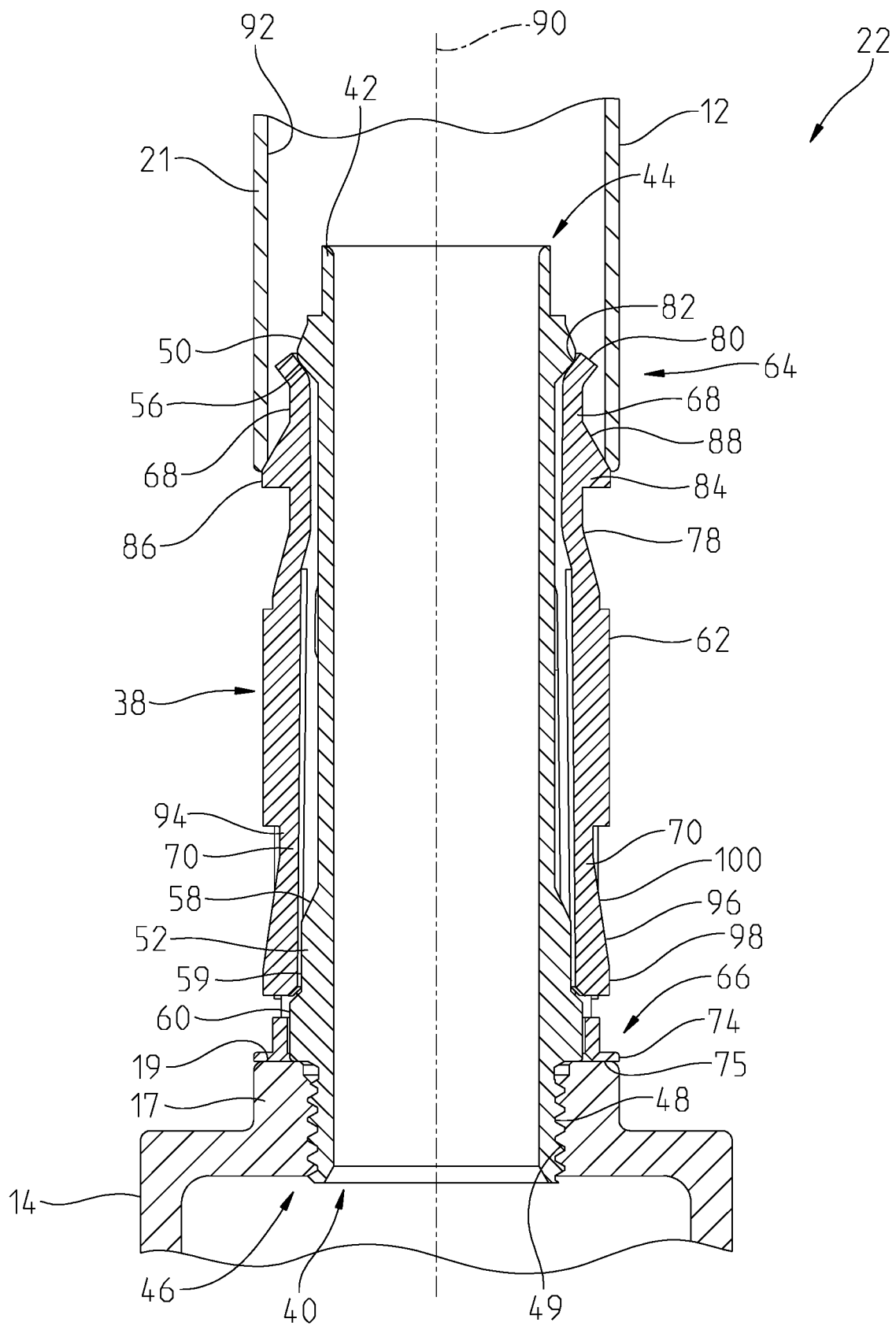
FIG. 5A is a cross-sectional view of the spout mounting assembly taken at line 5A-5A of FIG. 2, shown at an initial installation step.
Figure 5B:
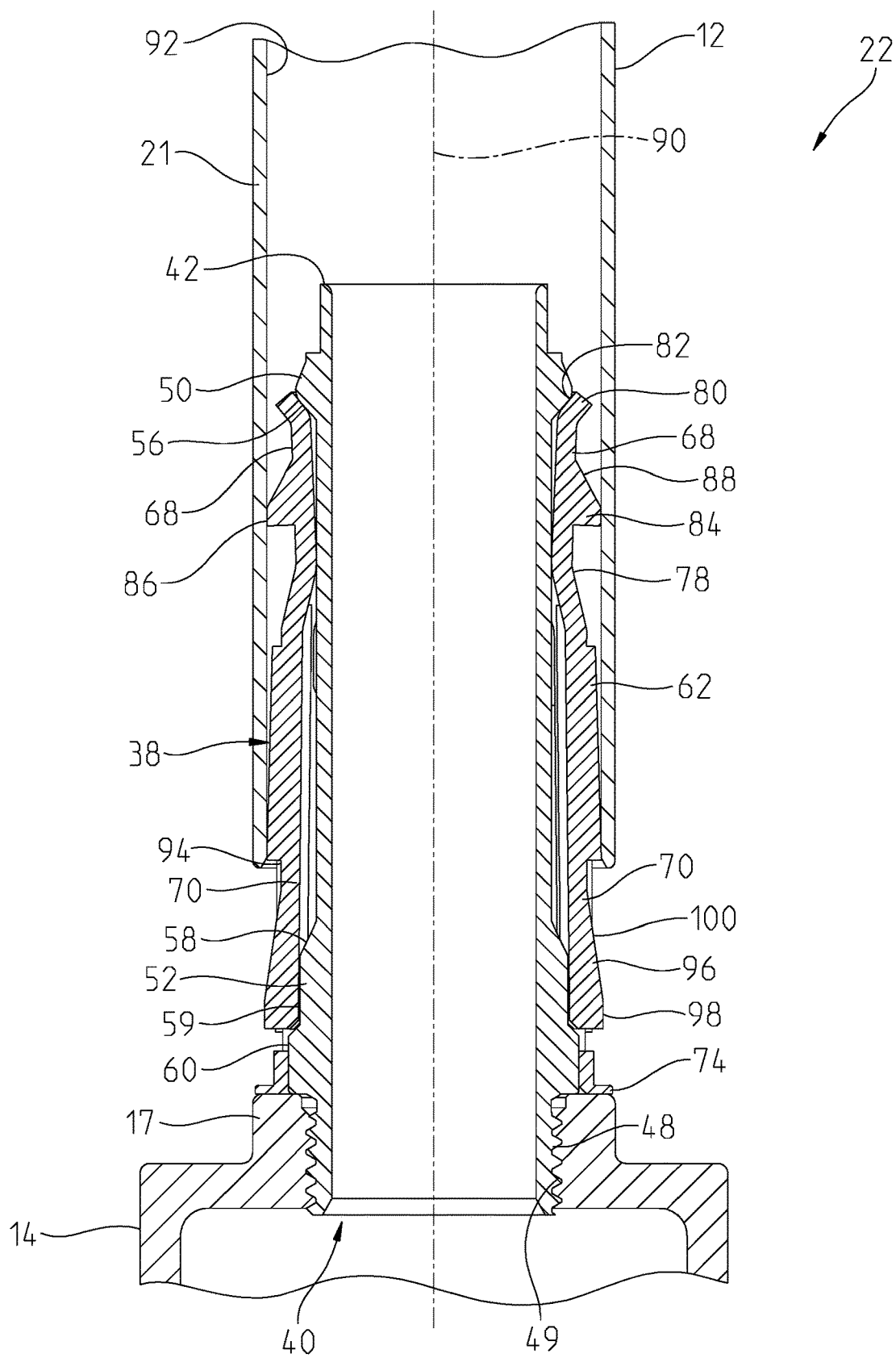
FIG. 5B is a cross-sectional view of the spout mounting assembly taken at line 5A-5A of FIG. 2, shown at an intermediate installation step.
Figure 5C:
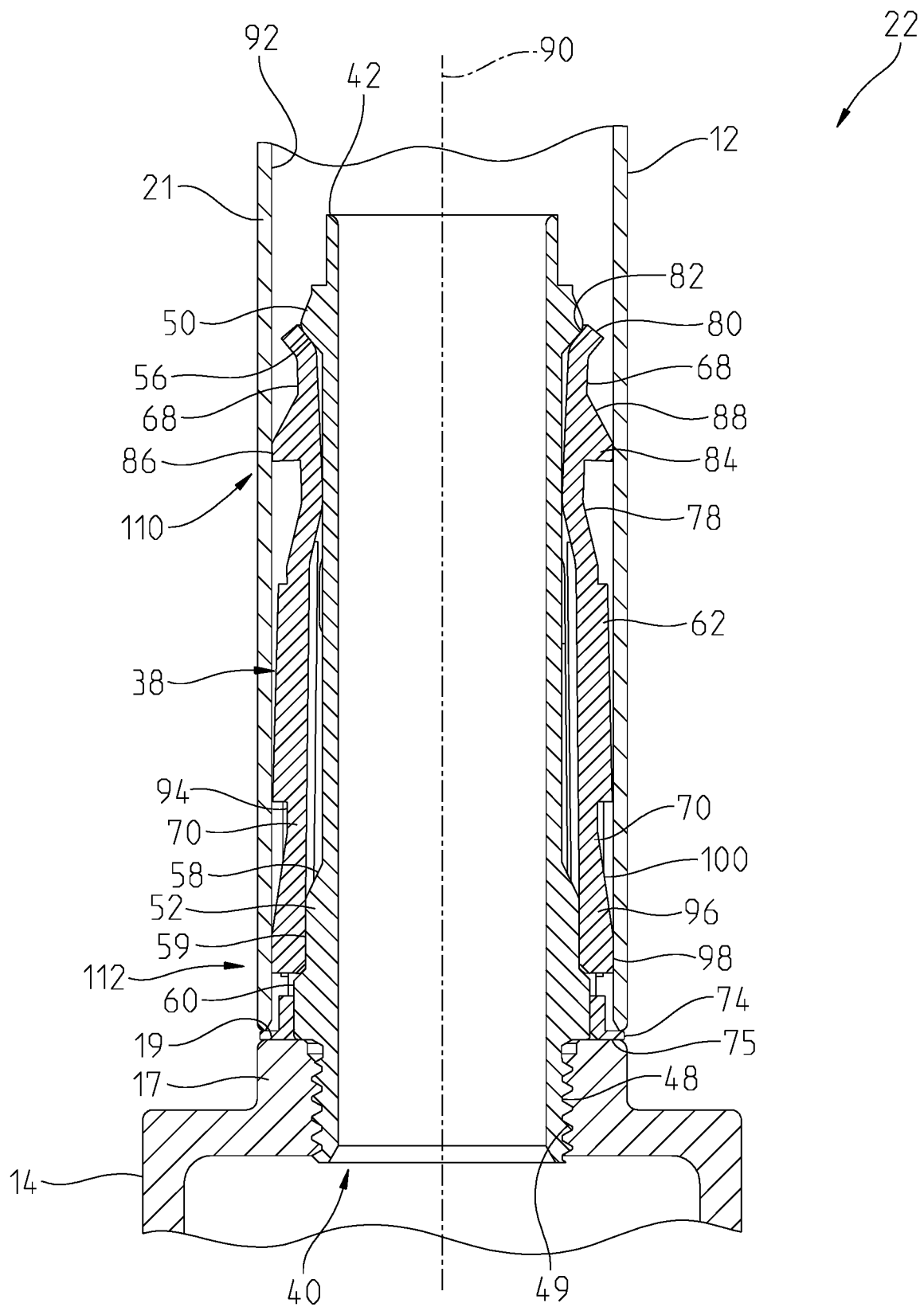
FIG. 5C is a cross-sectional view of the spout mounting assembly taken at line 5A-5A of FIG. 2, shown fully installed.
Figure 6:
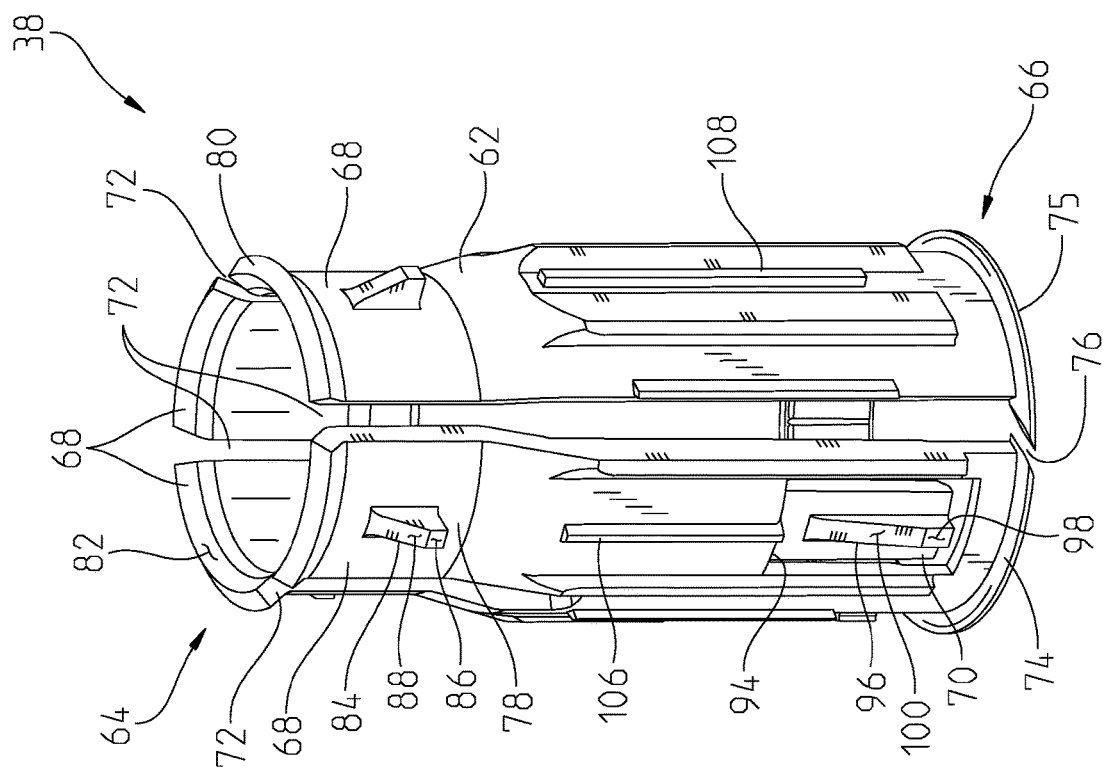
FIG. 6 is a front perspective view of the bushing of FIG. 3.
Figure 7:
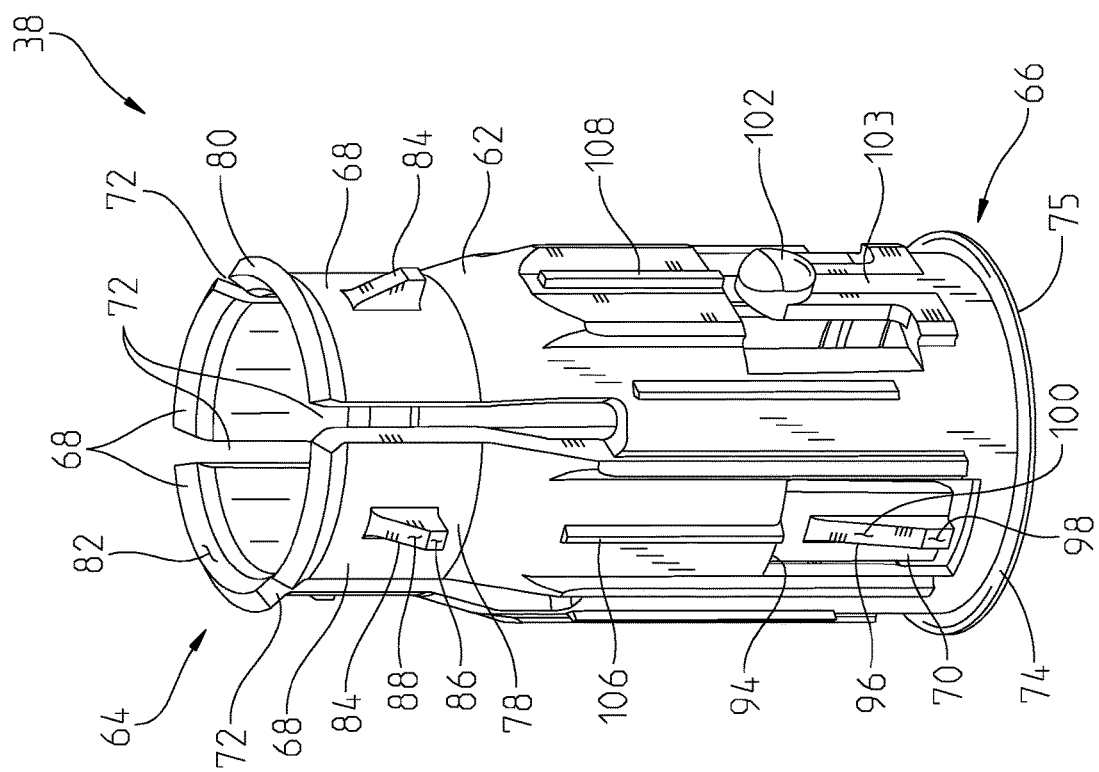
FIG. 7 is a rear perspective view of the bushing of FIG. 3

FIGS. 4A-5C show various illustrative installation steps to fully assemble the faucet spout 12 with the mounting hub 14 via the spout mounting assembly 20. FIGS. 4A-4C are cross-sectional views along line 4A-4A of FIG. 2 through the alignment tab 102 and anti-wobble rib 106. FIGS. 5A-5C are cross-sectional views along line 5A-5A of FIG. 2 through the diametrically opposed two lower tabs 36 and correspond to the installation steps of FIGS. 4A-4C, respectively.

FIGS. 4A and 5A show an illustrative initial installation step when the faucet spout tube 21 is being installed over the bushing 38 and the inner adapter 40. The inner adapter 40 connects to the hub 14 via cooperating threads 48 and 49. When the threads 48 are fully installed, the lower flange 60 of the inner adapter 40 is seated on the upper surface 19 of the hub 14. As the faucet spout tube 21 is lowered over the bushing 38, the inside surface 92 of the faucet spout tube 21 comes into contact with the outer surface 86 of upper tabs 84. As previously detailed, the upper tabs 84 are supported on flexible upper arms 68 such that force of faucet spout tube 21 pushing axially against the surface 86 causes upper tabs 84 to flex radially in toward the inner adapter 40. The top angled surface 82 of the bushing 38 engages the angled surface 56 of the inner adapter 40, while the lower surface 75 of the bushing 38 engages the upper surface 19 of the hub 14. As further detailed herein, the bushing 38 is captured between the surface 56 of the inner adapter 40 and the upper surface 19 of the hub 14. The planar surface 86 of each upper tab 84 ensures more contact with faucet spout tube 21 as compared to a pointed or non-flat surface.

FIGS. 4B and 5B show the faucet spout tube 21 at an illustrative intermediate assembly step after continuing to be installed axially farther down over the bushing 38. FIGS. 4C and 5C show the spout mounting assembly 20 in an illustrative fully installed state. When fully installed, inside surface 92 of faucet spout tube 21 is in contact with surfaces 86 of the upper tabs 84 and surfaces 98 of the lower tabs 96. This constrains bushing 38 axially and intermediate to the faucet spout tube 21 and the inner adapter 40. Furthermore, as described above, top angled surface 82 of the bushing 38 is pushed against angled surface 56 of the inner adapter 40, which also constrains bushing 38 in place. Additionally, the alignment tab 102 of the bushing 38 is engaged through the alignment hole 104 of the spout tube 21 to further axially secure the bushing 38 relative to the spout tube 21.

With reference to FIGS. 4C and 5C, an upper constraint 110 is defined between the bushing 38 and the outer spout tube 21, and a lower constraint 112 is defined between the bushing 38 and the hub 14 and is positioned axially below the upper constraint 110. The upper constraint 110 is defined when the angled surface 56 of the inner adapter 40 engages the angled surface 82 of the bushing 38 and thereby forces the flexible upper arms 68 outwardly against the inner surface 92 of the outer spout tube 21. The lower constraint 112 is defined when the upper surface 19 of the hub 14 engages the lower surface 75 of the bushing 38. An intermediate constraint may also be defined when the lower flange 60 of the inner adapter 40 forces the lower tabs 96 of the lower legs 70 of the bushing 38 into contact the inner surface 92 of the outer spout tube 21. The upper and lower constraints 110 and 112 hold the bushing 38 in place between the spout tube 21 and the inner adapter 40.

Anti-wobble ribs 106, 108 are also in contact with the inner surface 92 of the spout tube 21 and further help to prevent looseness or wobble in the fit of the bushing 38 between the spout tube 21 and the inner adapter 40. Additionally, the constraints 110 and 112 help ensure bushing 24 rotates with faucet spout tube 21 about the inner adapter 40. More particularly, the ribs 106, 108 are configured to maintain a radial interface between the spout 21 and the bushing 38. This permits the bushing 38 to rotate with the spout tube 21, creating a bearing surface between bushing 38 and the adapter 40. Wobble is reduced by capturing the bushing 38 between surfaces 19 and 56, holding the spout tube 21 rigid to the bushing 38 by the ribs 106, 108 (effectively making them one member) and allowing the surface 82 of the bushing 38 to ride against the angled surface 56 of the adapter 40.

When fully installed, the lower surface 75 of bottom flange 74 is seated flush against the upper surface 19 of the hub 14. The bottom flange 74 is illustratively positioned intermediate a bottom of the spout tube 21 and the upper surface 19 of the hub 14. Illustratively, the bottom flange 74 is part of bushing 38, which is made of a polymer. When installed, the bottom flange 74 acts as a spacer and prevents the metal faucet spout tube 21 from making contact with the metal inner adapter 40, thus avoiding metal on metal contact.

The tapered or inclined interface between the surfaces 56 and 82 of the inner adapter 40 and the bushing 38, respectively, permits the lip 80 of the bushing 38 to ride against the upper protrusion 50 of the inner adapter 40 which constantly maintains force at the upper constraint 110, thereby reducing a loose or sloppy feel of the spout 12 relative to the hub 14. This interface also permits the bushing 38 to pivot and slide against the inner adapter 40, which facilitates flexing of the upper arms 68 of the bushing 38 and compensates for tolerances while maintaining force therebetween.

The lower legs 70 flex against the lower protrusion 52 of the inner adapter 40 such that the bottom tabs 96 interface with the inner surface 92 of the spout tube 21. This lower constraint 112 ensures that force is maintained regardless of tolerances.

The split design of the bushing 38 facilitates assembly to the inner adapter 40, while still maintaining higher interferences required to reduce wobble of the spout tube 21 and increase rotational resistance of the spout tube 21. Finally, the upper and lower tabs 84 and 96 are configured to increase pull-off resistance of the spout tube 21 from the bushing 38 and, as such, the hub 14.

Although the invention has been described in detail with reference to certain preferred embodiments, variations and modifications exist within the spirit and scope of the invention as described and defined in the following claims.

What is claimed is:

1. A faucet spout mounting assembly comprising:
an outer spout tube including an inner surface;
an inner adapter including a radially outwardly extending protrusion having a downwardly angled surface;
a bushing positioned radially intermediate the outer spout tube and the inner adapter, the bushing including:
a plurality of circumferentially spaced flexible upper arms; and
an upwardly angled surface supported by the flexible upper arms; and
wherein the downwardly angled surface of the inner adapter engages the upwardly angled surface of the bushing thereby forcing the flexible upper arms of the bushing outwardly against the inner surface of the outer spout tube.

2. The faucet spout mounting assembly of claim 1, wherein the downwardly angled surface of the inner adapter faces axially downward and radially inward.

3. The faucet spout mounting assembly of claim 1, wherein the bushing includes a bottom leg radially biased against the inner surface of the outer spout tube by the inner adapter.

4. The faucet spout mounting assembly of claim 1, wherein the bushing includes an alignment tab received within an opening of the outer spout tube.

5. The faucet spout mounting assembly of claim 1, wherein the bushing is made of a polymer.

6. The faucet spout mounting assembly of claim 1, further comprising a mounting hub positioned below the outer spout tube, wherein the inner adapter extends above the mounting hub.

7. The spout mounting assembly of claim 6, wherein the bushing includes an annular lower flange positioned axially below a lower end of the outer spout tube and above the mounting hub.

8. The faucet spout mounting assembly of claim 7, wherein the bushing is captured between the outwardly extending portion of the inner adapter and the mounting hub.

9. A faucet spout mounting assembly comprising:
an outer spout tube including an inner surface;
an inner adapter having a downwardly angled surface;
a mounting hub positioned below the outer spout tube, wherein the inner adapter extends above the mounting hub;
a bushing positioned radially intermediate the outer spout tube and the inner adapter;
an upper constraint defined between the bushing and the outer spout tube; and
a lower constraint defined between the bushing and the mounting hub, the lower constraint positioned axially below the upper constraint.

10. The faucet spout mounting assembly of claim 9, wherein the bushing includes an upper arm radially biased against the inner surface of the outer spout tube by the downwardly angled surface of the inner adapter thereby defining the upper constraint.

11. The faucet spout mounting assembly of claim 10, wherein the downwardly angled surface of the inner adapter faces axially downward and radially inward.

12. The faucet spout mounting assembly of claim 9, wherein the bushing includes a bottom leg radially biased against the inner surface of the outer spout tube by the inner adapter.

13. The faucet spout mounting assembly of claim 9, wherein the bushing includes an alignment tab received within an opening of the outer spout tube.

14. The faucet spout mounting assembly of claim 9, wherein the bushing is made of a polymer.

15. The faucet spout mounting assembly of claim 9, wherein the bushing includes an annular lower flange engaging an upper surface of the mounting hub and thereby defining the lower constraint.

16. The faucet spout mounting assembly of claim 15, wherein the annular lower flange includes a split ring positioned axially below a lower end of the outer spout tube.

17. A faucet spout mounting assembly comprising:
an outer spout tube including an inner surface;
an inner adapter having an angled surface;
a mounting hub positioned below the outer spout tube, wherein the inner adapter extends above the mounting hub;
a bushing including:
an upper constraint having:
a plurality of circumferentially spaced flexible upper arms;
an angled surface supported by the flexible upper arms; and
wherein the angled surface of the inner adapter forces the flexible upper arms outwardly against the inner surface of the outer spout tube; and
a lower constraint defined by engagement between a lower surface of the bushing and an upper surface of the mounting hub.

18. The faucet spout mounting assembly of claim 17, wherein the bushing includes an alignment tab received within an opening of the outer spout tube.

19. The faucet spout mounting assembly of claim 17, wherein the bushing is made of a polymer.

20. The faucet spout mounting assembly of claim 17, wherein the bushing includes an annular lower flange positioned axially below a lower end of the outer spout tube and above the mounting hub, the lower flange defining the lower surface of the lower constraint.

* * * * *